US 8,839,358 B2

(12) United States Patent
Strauss et al.

(10) Patent No.: US 8,839,358 B2
(45) Date of Patent: Sep. 16, 2014

(54) PROGRESSIVE AUTHENTICATION

(75) Inventors: Karin Strauss, Seattle, WA (US);
Oriana Riva, Redmond, WA (US);
Douglas Burger, Redmond, WA (US);
Jaron Lanier, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 106 days.

(21) Appl. No.: 13/222,538

(22) Filed: Aug. 31, 2011

(65) Prior Publication Data
US 2013/0055348 A1  Feb. 28, 2013

(51) Int. Cl.
*G06F 7/04* (2006.01)
*G06F 17/30* (2006.01)

(52) U.S. Cl.
USPC ...... 726/2; 726/1; 726/19; 713/155; 713/169; 705/44; 705/64; 382/118; 382/124

(58) Field of Classification Search
USPC ............... 340/686.6, 5.2; 348/118; 382/17; 705/67; 709/225, 229; 713/170, 176, 713/186; 726/1, 3, 4, 7
See application file for complete search history.

(56) References Cited

U.S. PATENT DOCUMENTS

| | | | |
|---|---|---|---|
| 7,212,613 B2 | 5/2007 | Kim et al. | |
| 7,222,360 B1* | 5/2007 | Miller | 726/3 |
| 2004/0039909 A1* | 2/2004 | Cheng | 713/169 |
| 2005/0143171 A1 | 6/2005 | Loose | |
| 2008/0101658 A1* | 5/2008 | Ahern et al. | 382/115 |
| 2009/0116703 A1* | 5/2009 | Schultz | 382/118 |
| 2009/0157560 A1* | 6/2009 | Carter et al. | 705/80 |
| 2009/0158389 A1 | 6/2009 | Waltenberg et al. | |
| 2010/0066821 A1* | 3/2010 | Rosener et al. | 348/77 |
| 2010/0115610 A1 | 5/2010 | Tredoux et al. | |
| 2010/0134310 A1* | 6/2010 | Zheng et al. | 340/686.6 |
| 2010/0306832 A1* | 12/2010 | Mu et al. | 726/5 |
| 2010/0321155 A1* | 12/2010 | Ballard | 340/5.81 |
| 2011/0247045 A1* | 10/2011 | Rajagopal et al. | 726/1 |
| 2012/0144468 A1* | 6/2012 | Pratt et al. | 726/7 |

OTHER PUBLICATIONS

Takahiro Takeda et al., Biometric Personal Authentication by One Step Foot Pressure Distribution Change by Fuzzy Artificial Immune System, 2010.*

(Continued)

*Primary Examiner* — Andrew Nalven
*Assistant Examiner* — Huan V Doan
(74) *Attorney, Agent, or Firm* — Steve Wight; Judy Yee; Micky Minhas

(57) ABSTRACT

Progressive authentication is generally employed to establish the authenticity of a user, such as a user of a computing device, or a user that wants to access a proprietary data item, software application or on-line service. This can entail inputting authentication factors each of which corresponds to one or multiple attributes associated with the user, or historical patterns of one or more attributes associated with the user, or both, and a confidence level that estimates a reliability of the factor. Sensor readings captured by one or more sensors are also input. Each sensor senses a user attribute and are used to quantify each authentication factor confidence level. An overall confidence level is established based at least in part on a combination of the individual confidence levels. A user is then designated as being authentic whenever the established overall confidence level exceeds a prescribed authentication level. This process can be continuous with the overall confidence level being continually updated.

16 Claims, 5 Drawing Sheets

(56) References Cited

OTHER PUBLICATIONS

Campbell, J. P., W. M. Campbell, D. A. Jones, S. M. Lewandowski, D. A. Reynolds, and C. J. Weinstein, Biometrically enhanced software-defined radios, Proc. Software Defined Radio Technical Conf. in Orlando, Florida, SDR Forum, Nov. 17-19, 2003.

Covington, M. J., M. Ahamad, I. A. Essa, H. Venkateswaran, Parameterized authentication, Proc. 9th European Symposium on Research Computer Security, Lecture Notes in Computer Science, Sep. 13-15, 2004, pp. 276-292, Sophia Antipolis, France.

Jagadeesan, H., M. S. Fisiao, A novel approach to design of user re-authentication systems, Proc. of the 3rd IEEE Int'l Conf. on Biometrics: Theory, Applications and Systems, Sep. 28-29, 2009, pp. 379-384, IEEE Press Piscataway, NJ, USA.

Klosterman, A., G. Ganger, Secure continuous biometric-enhanced authentication, Technical Report CMU-CS-00-134, Carnegie Mellon University, May 2000.

\* cited by examiner

PROGRESSIVE AUTHENTICATION

BACKGROUND

Authentication of the identity of a user of a computing device, or a user that wants to access a proprietary data item, software application or on-line service, is important to prevent an unauthorized person from masquerading as an authorized user. This type of identity theft can have devastating results such as loss of secure information, theft of products or services, and so on.

Current authentication schemes for ensuring the authenticity of a user typically require a password from the user at the start of each session or after a period of inactivity. Some schemes wait a fixed amount of time before requiring re-authentication, which typically entails the user re-entering a password after this fixed amount of time elapses.

SUMMARY

Progressive authentication embodiments described herein are generally employed to establish the authenticity of a user, such as a user of a computing device, or a user that wants to access a data item, software application or on-line service. Generally, a computing device is used to establish the authenticity of a user by first inputting a plurality of pre-established authentication factors. Each of these factors corresponds to one or multiple attributes associated with the user, or historical patterns of one or more attributes associated with the user, or both, and each factor has a confidence level associated therewith that estimates a reliability of that factor in establishing the user's authenticity. In addition, sensor readings captured by one or more sensors are input, where each sensor senses one of the attributes associated with the user. The inputted sensor readings are then used to quantify each authentication factor confidence level, and an overall confidence level is established based at least in part on a combination of the individual confidence levels associated with the plurality of authentication factors. A user is then designated as being authentic whenever the established overall confidence level exceeds a prescribed authentication level.

In one embodiment, different authentication confidence thresholds are established for accessing different computing devices, pieces of data, applications or online services, or any individual items or features therein. To this end, in addition to the foregoing, these pre-established authentication thresholds which are associated with different items or features, or both, of the foregoing are input by the computing device. Each authentication threshold represents a threshold that the established overall confidence level has to exceed in order for the user to be allowed access to an item or feature. As such, a user is allowed access to each of the items or features that have an authentication threshold that is lower than the established overall confidence level threshold.

Still further, in one embodiment the authentication factors and associated confidences are continuously monitored, and used to continuously update the overall confidence level. As such, this embodiment involves continuously authenticating the user. More particularly, a computing device is used to establish the authenticity of a user by first inputting a plurality of pre-established authentication factors. Sensor readings captured by one or more sensors are continuously input, where each sensor senses one attribute associated with the user. The inputted sensor readings are then continuously used to quantify each authentication factor confidence level, and an overall confidence level is established and continuously updated based at least in part on a combination of the individual confidence levels associated with the plurality of authentication factors. The user is then deemed to be authentic as long as the current overall confidence level exceeds a prescribed authentication level.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
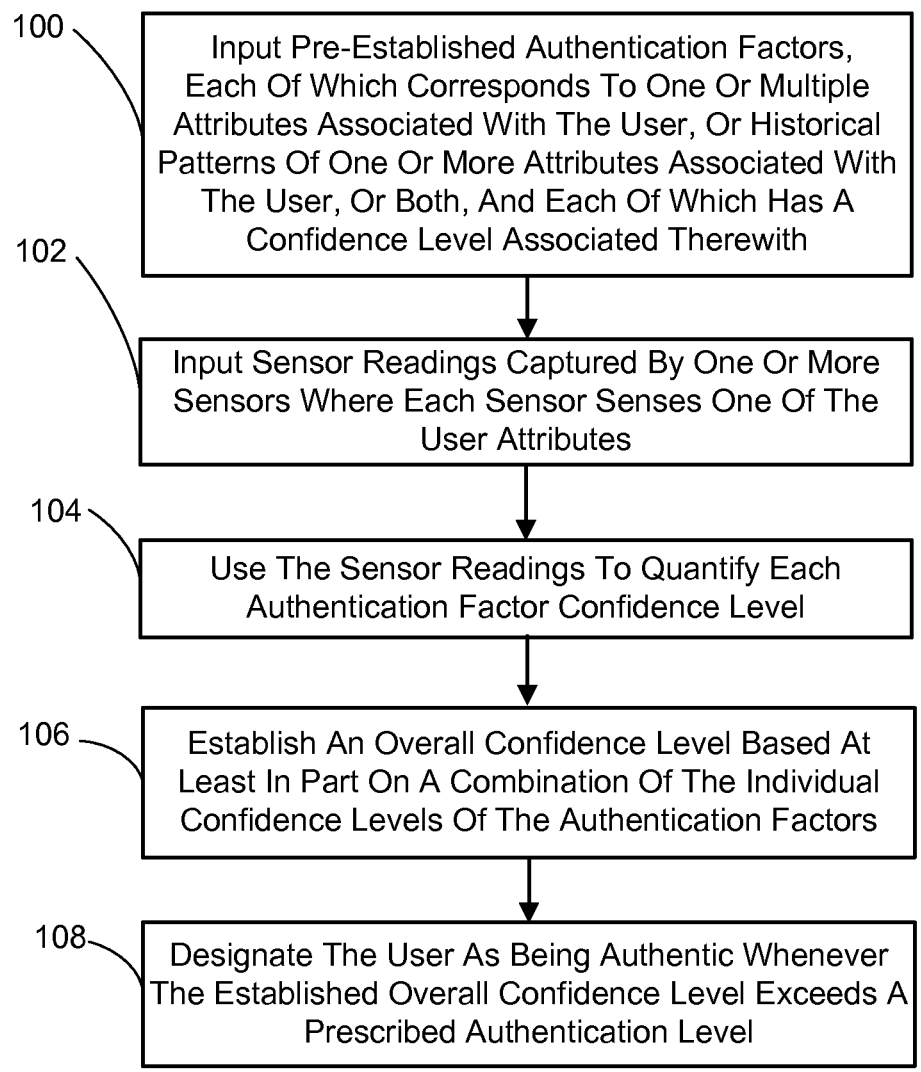
FIG. 1 is a flow diagram generally outlining one embodiment of a progressive authentication process for establishing the authenticity of a user.

In the following description of progressive authentication embodiments reference is made to the accompanying drawings which form a part hereof, and in which are shown, by way of illustration, specific implementations in which the embodiments may be practiced. It is understood that other implementations may be utilized and structural changes may be made without departing from the scope of the progressive authentication embodiments.

1.0 Progressive Authentication

Progressive authentication embodiments described herein are generally employed to establish the authenticity of a user. By way of example, but not limitation, these embodiments can be advantageously used to ensure the identity of a user of a computing device, or a user that wants to access a data item, software application or on-line service. This can be an initial authentication, but also provides particular advantages for re-authentication or continuous authentication of a user after that user has been initially authenticated as well as for "de-authentication". The term progressive authentication refers to this ability to re-establish or maintain a user authentication by constantly increasing or decreasing the confidence in the user authenticity. In general, the progressive authentication embodiments described herein employ multiple factors and respective confidences to authenticate a user. If a high enough confidence is reached, a user is automatically authenticated. This makes authentication with a personal device smoother and transparent. If a low enough confidence is reached, the user is automatically "de-authenticated". For example, this allows users to leave their devices unattended and have them automatically locked or have their devices protected in case of theft or loss.

As will be seen from the descriptions to follow, progressive authentication generally allows for a lower overhead by auto authenticating and improved security (e.g., deviation causes challenges to be issued-such as showing ones' face to camera for visual identification or entering PIN). In addition, the use of multiple factors makes it harder for an unauthorized user to impersonate an authorized user.

1.1 Using Multiple Factors and Respective Confidences for User Authentication As stated previously, in general, the progressive authentication embodiments described herein employ multiple factors and respective confidences to authenticate a user. These authentication factors each correspond to one or multiple attributes associated with the user, or historical patterns of one or more attributes associated with the user, or both. Generally, any authentication factor that tends to indicate the authenticity of a user, based on one or more measurable attributes of that user, can be employed.

For example, but without limitation, one factor could be a user holding an electronic device (such as a so-called smart phone) in a manner that indicates he or she is using the device. Many different measurable attributes could be used in association with such a factor to indicate whether or not the user is holding the device—such as, is the user holding the device in a manner indicative of use, or is the device in a lighted environment (versus a dark one such as in the user's pocket).

Another exemplary factor can be a user being in a particular location at a particular time of day (and/or day of the week). Thus, a measureable user attribute associated with this factor could be a historical pattern of the user's location over time, as well as the user's current location. Note here that the measurable attribute involves two different elements (namely location and time) or three elements (namely location, time, and day of the week). It is not necessary that a user attribute be a single element. Rather, an attribute can be defined as including multiple elements.

Yet another example of an authentication factor is a user's physical characteristics. Measureable user attributes associated with this factor can be things like the user's voice or appearance.

Still another authentication factor example is the user's proximity to some person, place or thing. Measurable attributes associated with this proximity factor can include the signal strength between two wireless devices capable of communication with each other, where one of the devices is thought to be in the possession of the user and the other thought to be co-located with the aforementioned person, place or thing. Note that in this example, it is possible that the person could be the user themselves. Thus, the attribute would be the signal strength between two device thought to be with the user. Another attribute that can be associated with the proximity factor is the distance between the user and another person, place or thing.

Interconnection between user personal devices (e.g., laptop, phone, desktop PC) can also be an authentication factor when the user is already authenticated on one of the devices. Measurable attributes associated with this interconnection factor can include the presence of a communication link between the devices.

The foregoing examples of authentication factors and corresponding attributes are but a small sampling of the possibilities, and not meant in any way to be an exhaustive listing. In general, as long as an authentication factor is indicative in some way of the authenticity of a user (i.e., that the user is who he or she is believed to be), and the associated attribute or attributes are measureable aspects of the user or the user's surroundings, this factor can be employed with the progressive authentication embodiments described herein.

One way of measuring an attribute is through the use of a sensor of some type. For example, but without limitation, these sensors can include a camera (such as one that can be used to capture an image of the user's face for an appearance-type attribute); or a microphone (such as one that can be used to capture the user's voice for a voice attribute); or any one or combination of a light sensor, humidity sensor, temperature sensor, orientation sensor, or touch sensor (that can be used to determine if a user is holding a device); or a Bluetooth signal strength detector, or Wi-Fi signal strength detector, or both (that can be used for an attribute involving the signal strength between two wireless devices); or a depth/distance sensor such as a 3D camera (that can be used for an attribute involving the distance between the user and another person, place or thing); or a location sensor such as a GPS receiver (that can be used for an attribute involving the location of the user). It is noted that the foregoing sensors are common and found in many of today's mobile computing devices—and so are readily available. However, it is in no way intended that the sensors that can be employed in association with the progressive authentication embodiment described herein are limited to those listed above, or that they must be readily available in mobile devices. In general, any sensor that is capable of providing a sensor reading for use in measuring a user attribute can be employed in connection with the progressive authentication embodiments described herein.

It is noted, however, that a sensor reading is not necessarily an exact measure of a user attribute and may be subject to deviations. In addition, authentication factors can vary in the strength. In other words, some authentication factor can provide a stronger indication of authenticity than others. For example, some factors can be easier to fake, and some are more discriminating than others. Given the inherent inaccuracies in sensor readings and the variability in the strength of authentication factor, in one embodiment, a confidence level is associated to each factor. In general, this authentication factor confidence level is an estimate of the reliability of that factor in establishing the user's authenticity.

In one embodiment, at least one of the authentication factors is associated with a user attribute that includes an expected sensor reading element which is considered indicative of the user being authentic. This attribute also includes a current sensor reading element which is measured using an appropriate sensor. The aforementioned authentication factor confidence level is then quantified based on how close the expected sensor reading element is to the current sensor reading. In one implementation, the authentication factor confidence level is quantified by assigning a prescribed confidence level value whenever the current sensor reading is within a prescribed range of the expected sensor reading. In another implementation, the authentication factor confidence level is quantified by assigning a confidence level value that is proportional to a measure of the degree of closeness between the current sensor reading and the expected sensor reading. In either of these implementations, the expected sensor reading can be prescribed, or it can be derived from a historical pattern of past sensor readings captured by one or more sensors sensing the user attribute associated with the expected sensor reading.

As stated previously, the progressive authentication embodiments described herein employ multiple factors and respective confidences to authenticate a user. In one implementation, this entails establishing an overall confidence level based at least in part on a combination of the individual confidence levels associated with the authentication factors. One way of combining the confidence levels is to employ prescribed conditional logic rules to combine the individual confidence levels. Examples of this will be provided later in this description. Also note that combining the individual confidence levels associated with the authentication factors can be just part of establishing the overall confidence level. Thus, other things can play into the overall confidence level as well, as will also be described in more detail later.

The foregoing aspects of the progressive authentication embodiments described herein can be realized in one general implementation outlined in FIG. 1. More particularly, a computing device is used to establish the authenticity of a user by first inputting a plurality of pre-established authentication factors (block 100). As indicated previously, each of these factors corresponds to one or multiple attributes associated with the user, or historical patterns of one or more attributes associated with the user, or both, and each factor has a confidence level associated therewith that estimates a reliability of that factor in establishing the user's authenticity. In addition, sensor readings captured by one or more sensors are input, where each sensor senses one of the attributes associated with the user (block 102). The inputted sensor readings are then used to quantify each authentication factor confidence level (block 104), and an overall confidence level is established based at least in part on a combination of the individual confidence levels associated with the plurality of authentication factors (block 106). A user is then designated as being authentic whenever the established overall confidence level exceeds a prescribed authentication level (block 108).

The foregoing process may be better understood by way of examples. Here again, these examples are intended to show how the foregoing procedure might be realized, and are not intended to be all inclusive or limiting of the scope of the progressive authentication embodiments described herein. A first example involves authentication factors that include the user holding a mobile communication device (such as a smart phone) in a manner that indicates he or she is using the device, and the user's proximity to computing devices with whom the user is currently authenticated. Sensor readings from a light sensor, an orientation sensor, and a proximity sensor such as a Bluetooth signal strength sensor, are input. In this case, the sensors are resident in the phone. The readings from the light sensor are used to measure a user attribute involving whether the aforementioned phone is in a lighted environment (versus a dark one such as in the user's pocket). This attribute is associated with the authentication factor of the user holding the phone in a manner that indicates he or she is using the device. The readings from the orientation sensor are used to measure a user attribute involving whether the phone is oriented properly for use by the user (versus for example laying on a table). This attribute is also associated with the authentication factor of the user holding the phone in a manner that indicates he or she is using the device, but considered separately. The readings from the proximity sensor are used to measure a user attribute involving the signal strength between the phone and another wireless computing device associated with the user. This attribute is associated with the authentication factor of the user's proximity to computing devices with whom the user is currently authenticated.

In a common situation, the user might first authenticate with the phone using username/password. After that, the user might place the phone in their pocket. When after some time, the user takes the device out of the pocket, multiple authentication factors are combined to establish user authentication with a certain confidence. For example, being close to other computing devices with whom the user is currently authenticated results in a confidence level between 0.1 and 1 (depending on the distance between devices), while being further away than a certain distance results in a confidence of 0 (e.g., beyond the Bluetooth range). Likewise, the confidence for light and orientation sensors are determined by the distance between the measured light and orientation readings, and the measurements associated to standard positions such as "holding", "in pocket", or "on table". The factors are then combined to determine the overall confidence on the user's authenticity. In this example, the following conditional logic rules are used to combine the authentication factor confidence levels. If the proximity confidence is greater than 0.6, and if either the light or orientation confidence is greater than 0.8, the user is authenticated. Conversely, if the proximity confidence is 0, the user is not designated as being authentic, and other methods would be required to access the phone, such as requiring the user to re-enter their username and password. These foregoing conditional logic rule thresholds and conditions may be configured by default and/or the user can be allowed to configure the thresholds and conditions to provide for more or less strict authentication criteria.

Another example involves authentication factors that include the user being in a particular location at a particular time of day, and the user's proximity to other persons, places or things associated with the user. In this example, sensor readings from a GPS receiver and a depth/distance sensor are input. The readings from the GPS receiver are used to measure a user attribute involving a historical pattern of the user's location over time, as well as the user's current location. This attribute is associated with the authentication factor of the user being in a particular location at a particular time of day. The readings from the proximity sensor are used to measure a user attribute involving a historical pattern of the user's proximity to various persons, places or things over time, as well as the user's current proximity to these persons, places or things. This attribute is associated with the authentication factor of the user's proximity to other persons, places or things associated with the user.

In this example, instead of determining confidence for the sensors based on the current measurements alone, past user behavior information is also employed. For example, a model may be derived from a series of GPS sensor readings over certain period of time (e.g., a month). This model encodes temporal and spatial information about where a device (e.g., a mobile phone) housing the sensor has typically been over that period of time at certain times of the day. The model can then generate a prediction of where the device is expected to be at a particular time, and a confidence level between 0 and 1.0 is calculated based on the difference between the expected location and the user's actual location based on current GPS readings. Likewise, the proximity sensor outputs can be captured over time to generate a model of the expected surrounding of a user at various times. The model is then used to predict the user surrounding for the current time and this is compared to the user's actual surroundings (as sensed by the proximity sensor). A confidence level between 0 and 1.0 is calculated based on the difference between the expected surroundings and the user's actual surroundings. The following conditional logic rules are then applied to combine the authentication factor confidence levels. If the either GPS or proximity confidence levels are greater than 0.8, the user is authenticated. Conversely, if both the GPS and proximity confidence levels are 0.8 or less, the user is not designated as being authentic, and other methods would be required to obtain the desired authentication.

It is noted that the authentication factors employed with the progressive authentication embodiments described herein can be pre-established in a number of ways. In one implementation, the factors and their associated attributes are established manually based on the particular application. In another implementation, conventional machine learning techniques can be employed to identify factors, attributes, and even confidence levels that are most important to a particular application. These processes for establishing the factors, attributes and confidence levels can also be dynamic, and updated over time.

1.1.1 Additional Considerations When Establishing The Overall Confidence Level As indicated previously the overall confidence level is established based on a combination of the individual confidence levels associated with the plurality of authentication factors. However, this can be just part of the considerations employed to generate the overall confidence level. Additional aspects or the user's circumstances can also be considered.

1.1.1.1 User Attribute Cross-Checking

In one embodiment, in addition to taking into consideration the combination of individual confidence levels, and possible other additional aspects of the user's circumstances, establishing the overall confidence level can additionally involve cross-checking at least one group of user attributes to determine if the sensor readings associated therewith are physically consistent with each other. If a sensor reading associated with a particular user attribute is indicative of a circumstance that is physically inconsistent with sensor readings associated with other user attributes, this can be an indication that the user is not who he or she is believed to be—and so should not be authenticated.

For example, if one user attribute involves user keyboard entries (sensed via the output of the keyboard) and another user attribute involving the user's physical movements (as sensed for example by a 3D camera), it is possible to cross-check the sensed keyboard entries with the readings from the 3D camera indicating the user's hand or arm positions in relation to the keyboard using a prescribed biomechanical model in order to determine if the user's hands or arms are in plausible position to hit a key that matches the coincident keyboard entry. If the user's hand or arm positions are plausible, a higher user attribute confidence level is assigned to the compared group of attributes than if the user's hand or arm positions were deemed implausible. The actual confidence level assigned can be based on how close the user's hand or arm positions match up to the keyboard strokes, or a prescribed accuracy measure of the 3D camera, or a pre-determined accuracy measure assigned to the biomechanical model, or any combination of these measures.

In general, a sensor reading associated with a user attribute is deemed physically consistent with one or more sensor readings associated with other user attributes if it is not indicative of a condition that would be physically improbable to a prescribed degree in view of conditions indicated by the one or more other sensor readings. In addition, generally, a user attribute cross-check confidence level is assigned to each group of user attributes involved in the cross-check based on the physical consistency determination of that group.

Once one or more user attribute cross-check confidence levels are established, the overall confidence level is established by combining the user attribute cross-check confidence level or levels with the individual confidence levels associated with the aforementioned authentication factors. In one implementation, this is done using prescribed conditional logic rules.

1.1.1.2 User Attribute and Non-User Factor Cross-Checking

In another embodiment, in addition to taking into consideration the combination of individual confidence levels, and possible other additional aspects of the user's circumstances (such as user attribute cross-checking), establishing the overall confidence level can additionally involve cross-checking at least one group of user attributes and non-user factors to determine if the sensor readings associated therewith are physically consistent with each other. A non-user factor corresponds to sensor readings which are not associated with the user, but are indicative of a condition of the user. For example, sensor readings obtained from a sensor belonging to a non-user such as a security camera feed that shows the user is currently at a particular location would qualify as a non-user factor.

If a sensor reading associated with a user attribute is indicative of a circumstance that is physically inconsistent with a sensor reading associated with a non-user factor, this can be an indication that the user is not who he or she is believed to be—and so should not be authenticated. In this embodiment, a sensor reading associated with a user attribute is deemed physically consistent with a sensor reading associated with a non-user factor if it is not indicative of a condition that would be physically improbable to a prescribed degree in view of conditions indicated by the non-user factor sensor readings. In addition, generally, a non-user factor cross-check confidence level is assigned to each group of user attributes and non-user factors involved in the cross-check based on the physical consistency determination of that group.

Once one or more non-user cross-check confidence levels are established, the overall confidence level is established by combining the non-user cross-check confidence level or levels with the individual confidence levels associated with the aforementioned authentication factors (and possibly one or more user attribute cross-check confidence levels as well). In one implementation, this is done using prescribed conditional logic rules.

1.1.1.3 User Attribute And User Data Item Cross-Checking

In another embodiment, in addition to taking into consideration the combination of individual confidence levels, and possible other additional aspects of the user's circumstances (such as user attribute cross-checking, and/or user attribute and non-user factor cross-checking), establishing the overall confidence level can additionally involve cross-checking at least one group of user attributes and one or more user data items to determine if the sensor readings associated with the user attributes are consistent with the one or more user data items. A user data item can be any information known about the user that is not currently being sensed by a sensor. For example, a user data item can be a user schedule indicating where the user is expected to be and at what time the user is expected to be at that location.

If a sensor reading associated with a user attribute is indicative of a circumstance that is physically inconsistent with a user data item, this can be an indication that the user is not who he or she is believed to be—and so should not be authenticated. In this embodiment, a sensor reading associated with a user attribute is deemed consistent with a user data item if it is not indicative of a condition that would be improbable to a prescribed degree in view of conditions indicated by the user data item. In addition, generally, a user data item cross-check confidence level is assigned to each group of user attributes and one or more user data items involved in the cross-check based on the consistency determination of that group. For example, if a user attribute representing the current location of the user is cross-checked with a user data item representing a user schedule indicating where the user is expected to be and at what time the user is expected to be at the location, and it is determined that the user is at a location and at a time which corresponds to the location and time listed in the user schedule, a higher user data item cross-check confidence level is assigned than would be if the listed location and time did not correspond to the user's current location.

Once one or more user data item cross-check confidence levels are established, the overall confidence level is established by combining the user data item cross-check confidence level or levels with the individual confidence levels associated with the aforementioned authentication factors (and possibly one or more user attribute cross-check confidence levels, and/or one or more non-user cross-check confidence levels, as well). In one implementation, this is done using prescribed conditional logic rules.

1.1.2 Feedback To The User

In one embodiment, visual or other sensorial cues are employed to provide feedback to a user on the overall confidence level, and to inform the user of what level and what additional actions are needed to obtain an authentication designation. This is advantageous because it provides sufficient information for a user to form a deterministic mental model about why he or she is not authenticated and how to raise the authenticity confidence level to become authenticated. For example, if the overall confidence level needed to access bank financial data is 1 and the current level is below 1, a user may be prompted with a screen requesting a PIN and showing a gauge of the current confidence. Although, in one implementation, the gauge of the current confidence is withheld if the current overall confidence level is below a prescribed value to hide this information from an unauthorized person who may have come into possession of the user's device.

Figure 2:
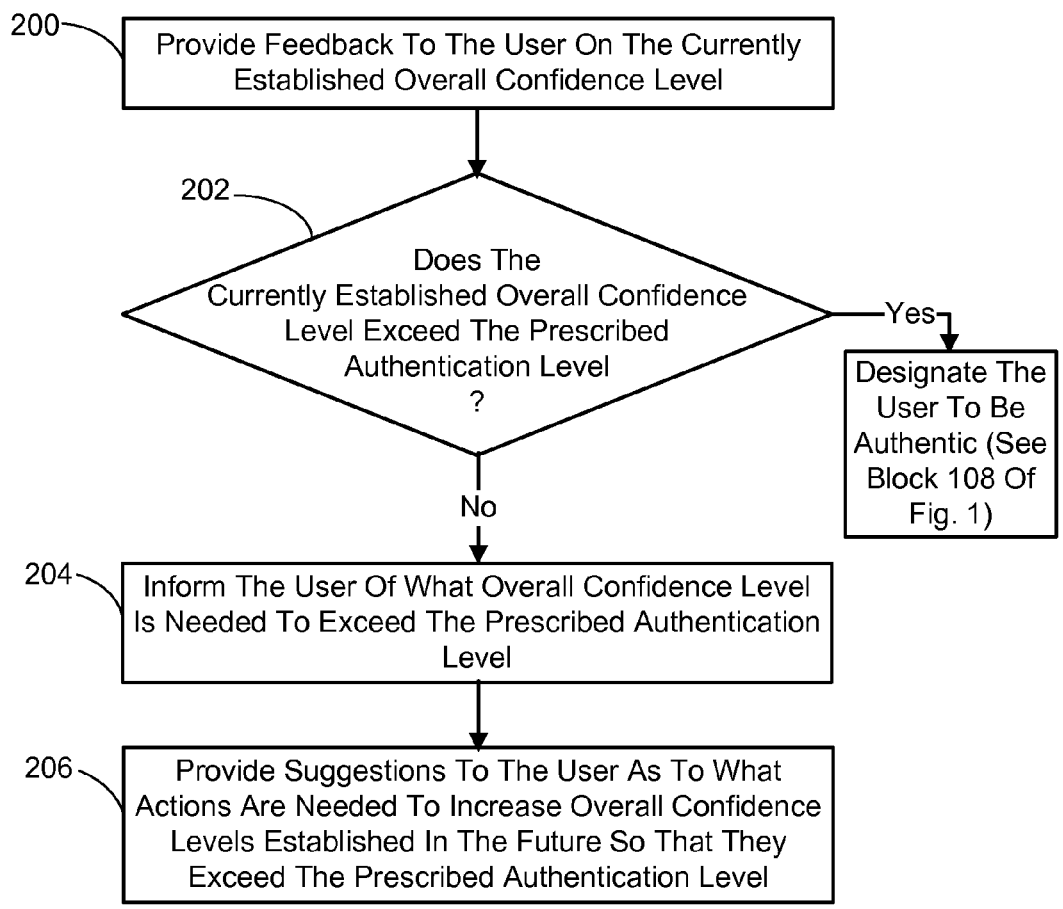
FIG. 2 is a flow diagram generally outlining one embodiment of a process for providing feedback to the user on the overall confidence level, and to inform the user of what level and what additional actions are needed to obtain an authentication designation.

The foregoing feedback feature can be realized in one implementation as follows. Referring to FIG. 2, a computing device first provides feedback to the user that is indicative of the currently established overall confidence level (block 200). It is then determined if the currently established overall confidence level exceeds the prescribed authentication level (block 202). If so, the user is designated as being authentic as indicated previously (see block 108 of FIG. 1). If, however, the prescribed authentication level is not exceeded by the overall confidence level, the user is informed of what overall confidence level is needed to exceed this level (block 204). In addition, suggestions are provided to the user as to what actions are needed to increase overall confidence levels established in the future so that they exceed the prescribed authentication level (block 206).

1.2 Authentication Thresholds and Selective Access to Data, Applications and Online Services The progressive authentication embodiments described herein can also include a feature that associates different authentication confidence levels (which can also be referred to as thresholds) to allow access to different computing devices, pieces of data, applications or online services, or even setting different confidence thresholds for individual items or features within a computing device, piece of data, application or online service. If the overall confidence level falls below one of these thresholds, access to the corresponding device, data, application, or online service is blocked until the confidence level rises above the threshold. It is noted that the foregoing thresholds can employ default values, and in one implementation one or more of the thresholds are user-configurable.

For instance, if the overall confidence level is greater than 0.5, the user could gain access to the camera, phone, and browser applications in a mobile device which has been associated with a threshold lower than 0.5. However, the user could not gain access to an address book, browsing history, social network online updates, or an email application, which require 0.6, 0.75 and 0.9 minimum confidence levels, respectively.

Figure 3:
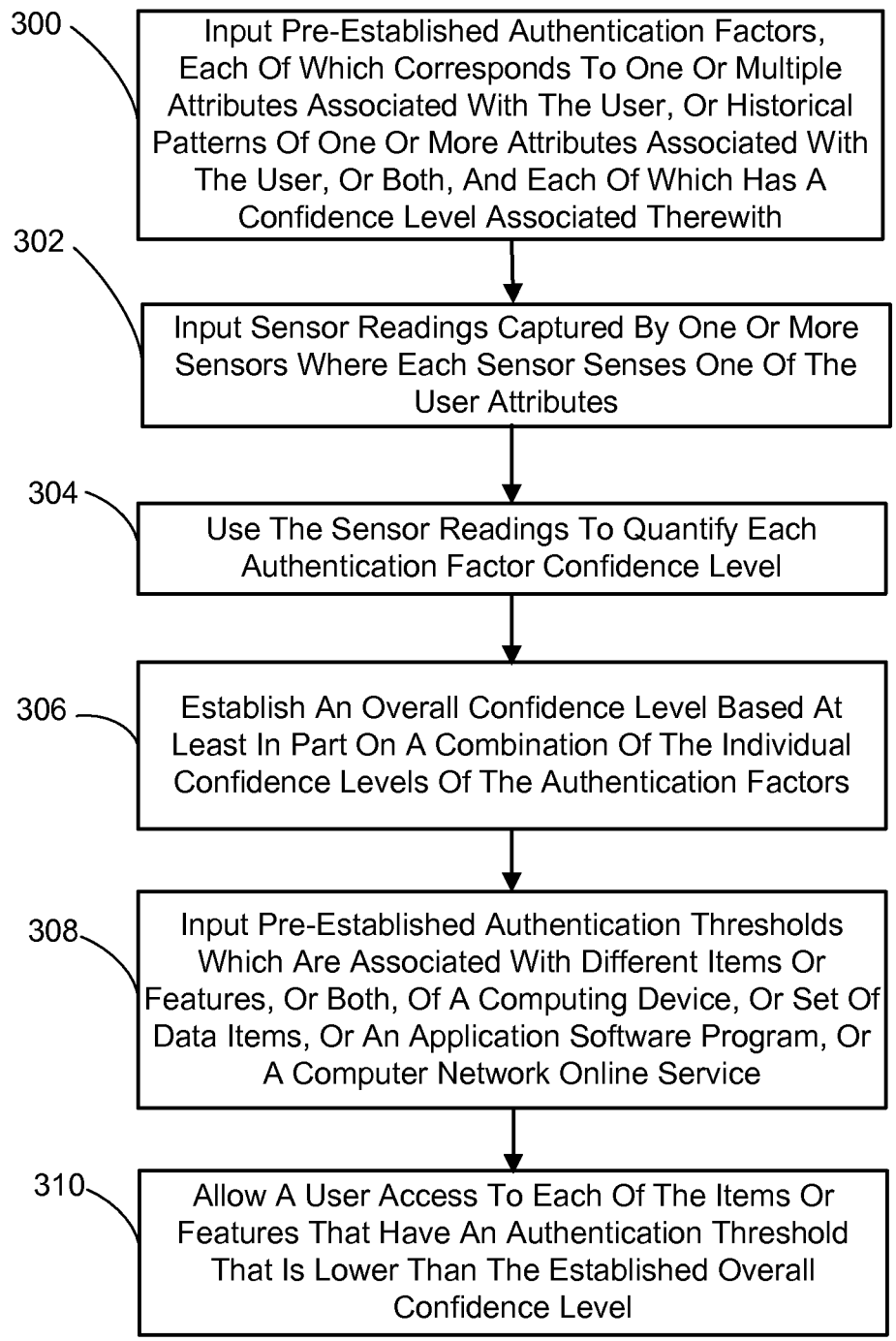
FIG. 3 is a flow diagram generally outlining one embodiment of a progressive authentication process for establishing the authenticity of a user in connection with the user accessing a feature or item of different computing devices, pieces of data, applications or online services.

Given the foregoing authentication thresholds feature, the process of FIG. 1 can be modified in one implementation as follows. Referring to FIG. 3, a computing device is used to establish the authenticity of a user in connection with the user accessing a feature or item by first inputting a plurality of pre-established authentication factors (block 300). In addition, sensor readings captured by one or more sensors are input, where each sensor senses one of the attributes associated with the user (block 302). The inputted sensor readings are then used to quantify each authentication factor confidence level (block 304), and an overall confidence level is established based at least in part on a combination of the individual confidence levels associated with the plurality of authentication factors (block 306). Next, pre-established authentication thresholds which are associated with different items or features, or both, of a computing device, or set of data items, or an application software program, or a computer network online service, are input (block 308). As indicated previously, an authentication threshold represents a threshold that the established overall confidence level has to exceed in order for the user to be allowed access to an item or feature. As such, a user is allowed access to each of the items or features that have an authentication threshold that is lower than the established overall confidence level (block 310).

1.3 Continuous Authentication

In the foregoing explanations of the progressive authentication embodiments described herein, the overall confidence level can be established periodically, or on an on-demand basis, or automatically when a user attempts to access a device, data item, application or on-line service. However, it is also possible to continuously monitor the authentication factors and associated confidences, and use them to continuously update the overall confidence level. Thus, this aspect consists of continuously trying to authenticate the user. If the overall confidence level falls below a certain threshold, the user loses access to certain devices, data, applications or services—and so would need to regain authentication.

Figure 4:
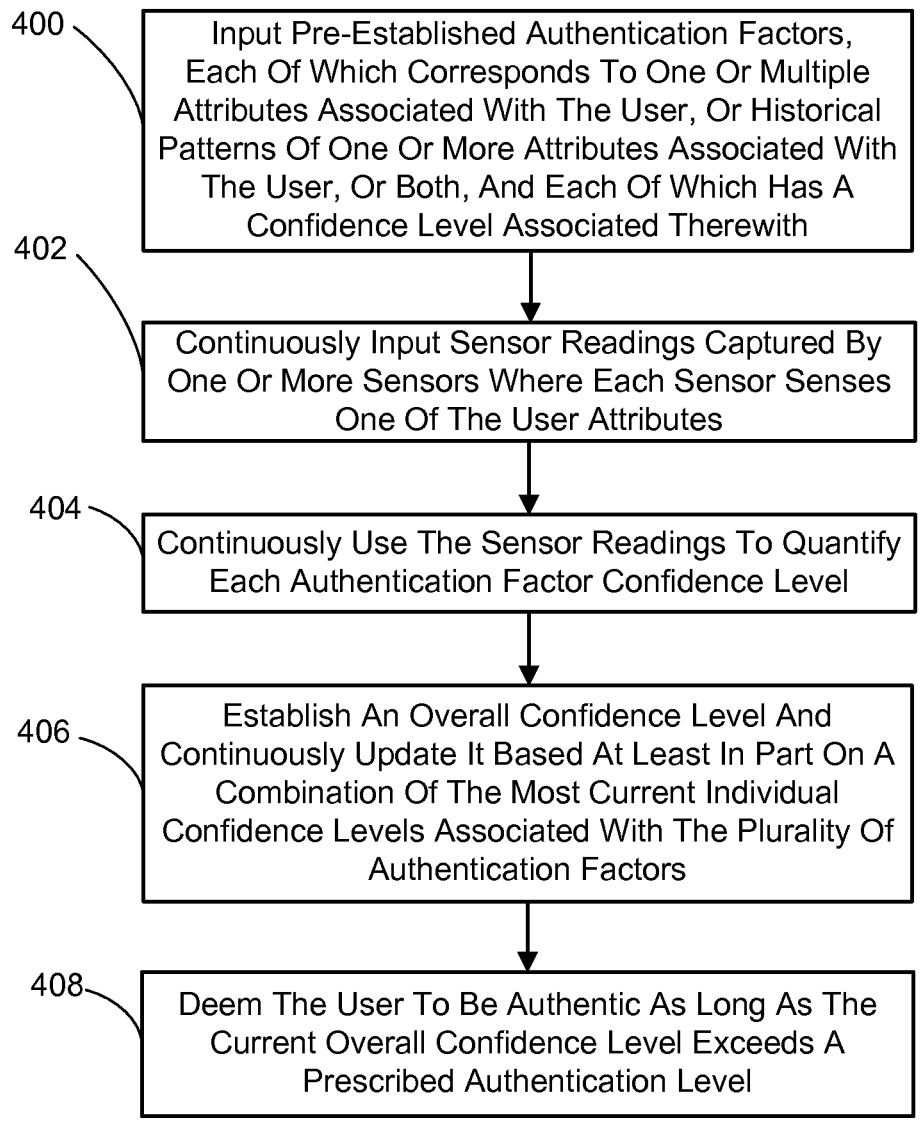
FIG. 4 is a flow diagram generally outlining one embodiment of a progressive authentication process for continuously assessing the authenticity of a user, where authentication factors and associated confidences are continuously monitored and used to continuously update the overall confidence level.

Given the foregoing continuous authentication feature, the process of FIG. 1 can be modified in one implementation as follows. Referring to FIG. 4, a computing device is used to establish the authenticity of a user by first inputting a plurality of pre-established authentication factors (block 400). As indicated previously, each of these factors corresponds to one or multiple attributes associated with the user, or historical patterns of one or more attributes associated with the user, or both, and each factor has a confidence level associated therewith that estimates a reliability of that factor in establishing the user's authenticity. Sensor readings captured by one or more sensors are continuously input, where each sensor senses one attribute associated with the user (block 402). The inputted sensor readings are then continuously used to quantify each authentication factor confidence level (block 404), and an overall confidence level is established and continuously updated based at least in part on a combination of the individual confidence levels associated with the plurality of authentication factors (block 406). The user is then deemed to be authentic as long as the current overall confidence level exceeds a prescribed authentication level (block 408).

A non-limiting example of the foregoing process is as follows. A user initially authenticates using a PIN and an initial overall confidence level is assigned. For instance, this initial overall confidence level can be set to 1. A touch sensor array and a camera are continuously monitored, each authentication factor confidence level is continuously quantified and the overall confidence level is continuously updated. As long as the user is touching the array and in view of the camera, the overall confidence level remains at the same level. However, once one of these conditions ceases to be true, the confidence level falls, and depending on the prescribed authentication level, the user could be de-authenticated.

With regard to this user de-authentication, in one implementation, the user is abruptly de-authenticating whenever the current overall confidence level does not exceed the prescribed authentication level. However, in another implementation, whenever the current overall confidence level does not exceed the prescribed authentication level, the user is de-authenticated only after a prescribed period of time. It is noted that this prescribed period of time can be user-specified. In yet another implementation, whenever the current overall confidence level does not exceed a prescribed authentication level, the overall confidence level is gradually decreased over time and the user is de-authenticated for any item or feature that has a higher confidence level threshold at the time the user attempts to access that item or feature.

It is noted that in one implementation, continued authentication of a user over time is seen as a further indication the user is authentic and the overall confidence level is increased. More particularly, each time the overall confidence level is updated and the user remains authenticated, the overall confidence level is increased over its established level by a prescribed amount. The prescribed amount of the increase can either be a fixed amount or can vary over time based on a prescribed function.

It is also noted with regard to authentication factors associated with a historical pattern of a user attribute, in one implementation, a dynamic history-based model is employed. In a dynamic model, the historical pattern is continuously updated based on new sensor readings.

2.0 Exemplary Operating Environments

Figure 5:
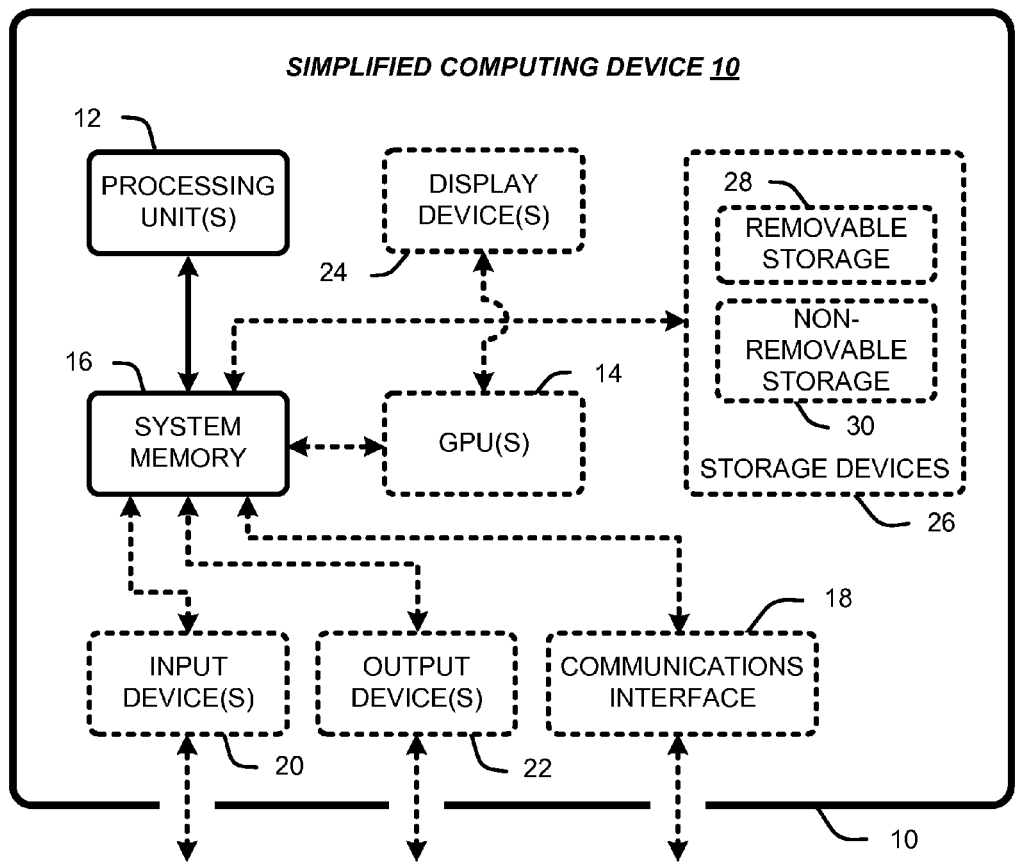
FIG. 5 is a diagram depicting a general purpose computing device constituting an exemplary system for implementing progressive authentication embodiments described herein.

The progressive authentication embodiments described herein are operational within numerous types of general purpose or special purpose computing system environments or configurations. FIG. 5 illustrates a simplified example of a general-purpose computer system on which various embodiments and elements of the progressive authentication embodiments, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement the progressive authentication embodiments described herein, the device should have a sufficient computational capability and system memory to enable basic computational operations. In particular, as illustrated by FIG. 5, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 5 may also include other components, such as, for example, a communications interface 18. The simplified computing device of FIG. 5 may also include one or more conventional computer input devices 20 (e.g., pointing devices, keyboards, audio input devices, video input devices, haptic input devices, devices for receiving wired or wireless data transmissions, etc.). The simplified computing device of FIG. 5 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 5 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various progressive authentication embodiments described herein, or portions thereof, may be stored, received, transmitted, or read from any desired combination of computer or machine readable media or storage devices and communication media in the form of computer executable instructions or other data structures.

Finally, the progressive authentication embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for establishing the authenticity of a user, comprising:
using a computer to perform the following process actions:
inputting a plurality of pre-established authentication factors each of which corresponds to one or multiple attributes associated with the user, or historical patterns of one or more attributes associated with the user, or both, and each factor of which has a confidence level associated therewith that estimates a reliability of that factor in establishing the user's authenticity;
inputting readings captured by multiple sensors, each sensor of which senses a one of said attributes associated with the user;
employing the inputted sensor readings to quantify each authentication factor confidence level;
cross-checking at least one group comprising different user attributes to determine if the inputted sensor readings associated therewith are physically consistent with each other, wherein a sensor reading associated with a user attribute is deemed physically consistent with one or more other sensor readings associated with other user attributes in the same group if it is not indicative of a condition that would be physically improbable to a prescribed degree in view of conditions indicated by the one or more other sensor readings;
assigning a cross-check confidence level to each group of different user attributes based on said physical consistency determination of that group;
establishing an overall confidence level based at least in part on a combination of the individual confidence levels associated with the plurality of authentication factors and cross-check confidence level or levels by employing prescribed conditional logic rules; and
designating a user to be authenticated whenever the established overall confidence level exceeds a prescribed authentication level.

2. The process of claim 1, wherein at least one of the authentication factors is associated with an attribute that comprises an expected sensor reading element which is considered indicative of the user being authentic, and wherein the process action of employing the inputted sensor readings to quantify each authentication factor confidence level, comprises an action of assigning a confidence level to said at least one authentication factor based on how close the expected sensor reading of that factor is to an inputted sensor reading associated with the same user attribute as the factor.

3. The process of claim 2, wherein the process action of assigning a confidence level to said at least one authentication factor based on how close the expected sensor reading of that factor is to an inputted sensor reading associated with the same user attribute as the factor, comprises an action of assigning a prescribed confidence level value whenever said inputted sensor reading is within a prescribed range of the expected sensor reading.

4. The process of claim 2, wherein the process action of assigning a confidence level to said at least one authentication factor based on how close the expected sensor reading of that factor is to an inputted sensor reading associated with the same user attribute as the factor, comprises an action of assigning a confidence level value that is proportional to a measure of the degree of closeness between said inputted sensor reading and the expected sensor reading.

5. The process of claim 2, wherein said expected sensor reading is prescribed.

6. The process of claim 2, wherein said expected sensor reading is derived from a historical pattern of past sensor readings captured by one or more sensors sensing the user attribute associated with the expected sensor reading.

7. The process of claim 1, further comprising process action of:
providing feedback to the user which is indicative of a currently established overall confidence level;
whenever the currently established overall confidence level does not exceed the prescribed authentication level,
informing the user of what overall confidence level is needed to exceed the prescribed authentication level, and
providing suggestions to the user as to what actions are needed to increase overall confidence levels established in the future so that they exceed the prescribed authentication level.

8. The process of claim 1, wherein a different prescribed authentication level is associated with different items or features, or both, of a computing device, or set of data items, or an application software program, or a computer network online service, and can vary between the different items or features, or both, and wherein the process action of designating a user to be authenticated whenever the established overall confidence level exceeds a prescribed authentication level, comprises allowing a user access to each of said items or features, or both, that have a prescribed authentication level that is lower than the established overall confidence level.

9. A computer-implemented process for establishing the authenticity of a user, comprising:
using a computer to perform the following process actions:
inputting a plurality of pre-established authentication factors each of which corresponds to one or multiple attributes associated with the user, or historical patterns of one or more attributes associated with the user, or both, and each factor of which has a confidence level associated therewith that estimates a reliability of that factor in establishing the user's authenticity;

continuously inputting readings captured by multiple sensors, each sensor of which senses a one of said attributes associated with the user;

continuously employing the inputted sensor readings to quantify each authentication factor confidence level;

continuously cross-checking at least one group comprising different user attributes and different non-user factors to determine if the inputted sensor readings associated therewith are physically consistent with each other, wherein a sensor reading associated with a user attribute or non-user factor is deemed physically consistent with one or more other sensor readings associated with other user attributes or non-user factors in the same group if it is not indicative of a condition that would be physically improbable to a prescribed degree in view of conditions indicated by the one or more other sensor readings, wherein a non-user factor corresponds to sensor readings which are not associated with the user, but which are indicative of a condition of the user;

assigning a non-user cross-check confidence level to each group of different user attributes and different non-user factors based on said physical consistency determination of that group;

establishing an overall confidence level based at least in part on a combination of the individual confidence levels associated with the plurality of authentication factors and the non-user cross-check confidence level or levels by employing prescribed conditional logic rules, and continuously updating the level; and deeming a user to be authentic as long as the current overall confidence level exceeds a prescribed authentication level.

10. The process of claim 9, wherein at least one of the authentication factors comprises an expected sensor reading for a one of said attributes associated with the user which is considered indicative of the user being authentic, said expected sensor reading being continuously derived from a historical pattern of sensor readings captured by one or more sensors sensing the user attribute associated with the expected sensor reading, and wherein the historical pattern of sensor readings is continuously updated using new sensor readings as they become available.

11. The process of claim 9, further comprising a process action of abruptly de-authenticating the user whenever a current overall confidence level does not exceed the prescribed authentication level.

12. The process of claim 9, further comprising a process action of, whenever a current overall confidence level does not exceed the prescribed authentication level, de-authenticating a user after a prescribed period of time.

13. The process of claim 9, further comprising the process actions of,
de-authenticating the user whenever a current overall confidence level does not exceed the prescribed authentication level; and
increasing each overall confidence level established over its established level by a prescribed amount for as long as the user remains authenticated, wherein said prescribed amount of the increase can either be a fixed amount or can vary over time based on a prescribed function.

14. A computer-implemented process for establishing the authenticity of a user in connection with the user accessing a feature or item, comprising:
using a computer to perform the following process actions:
inputting a plurality of pre-established authentication factors each of which corresponds to one or multiple attributes associated with the user, or historical patterns of one or more attributes associated with the user, or both, and each factor of which has a confidence level associated therewith that estimates a reliability of that factor in establishing the user's authenticity;
inputting readings captured by multiple sensors, each sensor of which senses a one of said attributes associated with the user;
employing the inputted sensor readings to quantify each authentication factor confidence level;
cross-checking the at least one group comprising different user attributes and one or more user data items to determine if the inputted sensor readings associated with the user attributes are consistent with the one or more user data items, wherein a sensor reading associated with a user attribute is deemed consistent with a user data item in the same group if it is not indicative of a condition that would be improbable to a prescribed degree in view of the user data item, and wherein a user data item represents information known about the user that is not currently being sensed by a sensor;
assigning a user data item cross-check confidence level to each group of different user attributes and one or more user data items based on said consistency determination of that group;
establishing an overall confidence level based at least in part on a combination of the individual confidence levels associated with the plurality of authentication factors and the user data item cross-check confidence level or levels by employing prescribed conditional logic rules;
inputting a plurality of pre-established authentication thresholds which are associated with different items or features, or both, associated with a computing device, or set of data items, or an application software program, or a computer network online service, wherein an authentication threshold represents a threshold that the established overall confidence level has to exceed in order for the user to be allowed access to one of said items or features; and
allowing a user access to each of said items or features, or both, that have an authentication threshold that is lower than the established overall confidence level.

15. The process of claim 14, wherein said pre-established authentication thresholds vary between the different items or features, or both.

16. The process of claim 14, wherein said at least one group comprising user attributes and one or more user data items comprises a user attribute representing the current location of the user and a user data item representing a user schedule indicating where the user is expected to be and at what time the user is expected to be at the location, such that when it is determined during said cross-checking that the user is at a location and at a time which correspond to the location and time listed in the user schedule, a higher user data item cross-check confidence level is assigned than would be if the listed location and time did not correspond to the user's current location.

* * * * *